United States Patent
Steiner et al.

(10) Patent No.: US 12,259,242 B2
(45) Date of Patent: Mar. 25, 2025

(54) LASER TRACKER-BASED SURVEYING SYSTEM WITH INERTIAL MEASUREMENT UNIT

(71) Applicant: LEICA GEOSYSTEMS AG, Heerbrugg (CH)

(72) Inventors: Markus Steiner, Gränichen (CH); Tomasz Kwiatkowski, Moosleerau (CH); Johan Stigwall, St. Gallen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 407 days.

(21) Appl. No.: 17/903,769

(22) Filed: Sep. 6, 2022

(65) Prior Publication Data
US 2023/0074716 A1    Mar. 9, 2023

(30) Foreign Application Priority Data
Sep. 7, 2021   (EP) ..................... 21195287

(51) Int. Cl.
*G01C 15/00*   (2006.01)
*G01B 11/00*   (2006.01)

(52) U.S. Cl.
CPC .......... *G01C 15/004* (2013.01); *G01B 11/005* (2013.01)

(58) Field of Classification Search
CPC .... G01C 15/004; G01B 11/005; G01B 11/002
See application file for complete search history.

(56) References Cited

U.S. PATENT DOCUMENTS

| | | | | |
|---|---|---|---|---|
| 5,956,660 | A * | 9/1999 | Neumann | G01C 21/188 702/94 |
| 11,480,690 | B2 * | 10/2022 | Grgich | G01S 19/44 |
| 11,693,120 | B2 * | 7/2023 | Angelo | G01S 19/072 342/357.44 |
| 12,085,378 | B2 * | 9/2024 | Muller et al. | G01C 15/002 |
| 2009/0115655 | A1 * | 5/2009 | Scherzinger | G01S 19/51 342/357.34 |
| 2014/0046589 | A1 | 2/2014 | Metzler et al. | |
| 2023/0074716 | A1 * | 3/2023 | Steiner | G01C 15/004 |

FOREIGN PATENT DOCUMENTS

| | | | | |
|---|---|---|---|---|
| EP | 2511656 A1 * | 10/2012 | | G01B 21/04 |
| WO | 2021069079 A1 | 4/2021 | | |

OTHER PUBLICATIONS

Yang et al. "Enhanced 6D measurement by integrating an Inertial Measurement Unit (IMU) with a 6D sensor unit of a laser tracker" Optics and Lasers in Engineering; vol. 126, Mar. 2020, 105902.
European Search Report in Application No. 21195287 dated Feb. 4, 2022.

\* cited by examiner

*Primary Examiner* — Yaritza Guadalupe-McCall
(74) *Attorney, Agent, or Firm* — Maschoff Brennan

(57) ABSTRACT

The invention relates to a laser tracker-based surveying system having a measurement aid which comprises an inertial measurement unit (IMU). The surveying system is designed to determine coordinates of points of a surface which are sampled by means of the measurement aid.

15 Claims, 2 Drawing Sheets

LASER TRACKER-BASED SURVEYING SYSTEM WITH INERTIAL MEASUREMENT UNIT

TECHNICAL FIELD OF THE INVENTION

The invention relates to a laser tracker-based surveying system having a measurement aid and a measurement aid acquisition unit for acquiring and following the measurement aid. The surveying system is configured to determine coordinates of points of a surface which are sampled by means of the measurement aid.

BACKGROUND

In object surveying technology, various surveying systems are known for determining 3D coordinates of points of an object surface which are to be surveyed, so-called surface points. Each system is based on the use of a specific measurement aid, which comprises a measurement head/sensor and by means of which an object surface is sampled. In this case, the surveying task and, in particular, requirements defined therein for the measurement accuracy/speed dictate the selection of the measurement aid. There are tactilely or contactlessly, or tactilely and contactlessly, sampling measurement aids. Tactilely sampling measurement aids comprise, for example, a measurement sampler in the form of a pin with a ruby ball fastened on one end. The ruby ball is brought to touch a point to be surveyed of an object surface and, on the basis thereof, the 3D coordinates of this point are determined by the surveying system. Contactlessly sampling measurement aids, for example laser scanners, comprise a beam source for emitting measurement radiation, a point to be surveyed of an object surface being illuminated by the measurement radiation and measurement radiation being reflected by this illuminated point and, on the basis thereof, the 3D coordinates of this point being determined by the surveying system.

Such tactilely and/or contactlessly sampling measurement aids may for example be used in combination with a coordinate measuring machine (CMM), an automatically guided kinematic chain or a robot arm, or may be designed to be guided manually by a user.

For high-precision determination of 3D coordinates of sampled points of a surface, high-precision determination of the position and typically the orientation of the measurement aid is crucially important.

DESCRIPTION OF THE INVENTION

It is therefore an object of the invention to provide a surveying system which allows high-precision determination of 3D coordinates of surface points to be surveyed.

It is a further object of the invention to provide a surveying system which can be used flexibly, for example in which the measurement aid can be machine-guided and/or manually guided and allows efficient surveying of surface points.

It is a further object of the invention to provide a surveying system which allows simple and intuitive operation.

The surveying system according to the invention is laser tracker-based and designed for the laser tracker-based determination of coordinates, in particular 3D coordinates, of points of a surface which are to be surveyed.

For this purpose, the surveying system according to the invention has a measurement aid for sampling the points of the surface which are to be surveyed, the measurement aid being in particular a laser scanner.

The measurement aid comprises an inertial measurement unit (IMU) for determining movement data of the measurement aid, a reflector, and a plurality of measurement aid markings, the plurality of measurement aid markings being arranged in a determined position relation with respect to one another and so as to form a pattern on the measurement aid, so that by using the surveying system, a position can be determined by means of the reflector and an orientation of the measurement aid can be determined by means of the measurement aid markings, or by means of the pattern.

The surveying system furthermore comprises a distance measurement module, a beam module for variable-direction emission of acquisition radiation, and an alignable measurement aid acquisition unit, which is communicatively connectable to the measurement aid and has an acquisition field of view.

In this case, the measurement aid acquisition unit is configured to acquire and follow the measurement aid on the basis of acquisition radiation reflected by the reflector, to acquire the measurement aid markings, and to determine coordinates of the points of the surface which are to be surveyed, on the basis of the acquisition and following of the measurement aid, the acquisition of the measurement aid markings, a distance to the measurement aid, determined by means of the distance measurement module, and the sampling by the measurement aid of the points of the surface which are to be surveyed.

In this case, the measurement aid acquisition unit is furthermore configured to determine coordinates of the points of the surface which are to be surveyed, on the basis of the measurement aid movement data determined by the IMU.

The surveying system is furthermore configured to align the measurement aid acquisition unit on the basis of the measurement aid movement data determined by the IMU, in such a way that the reflector is inside the acquisition field of view.

The measurement aid may, for example, be a laser scanner which contactlessly samples the points of the surface which are to be surveyed, by means of measurement radiation. The laser scanner may, for example, measure a distance from the measurement aid to a point to be surveyed of the surface on the basis of the principle of triangulation. The measurement aid may also be a white light scanner which measures a distance from the measurement aid to a point to be surveyed of the surface. The measurement aid may also be a non-scanning measurement aid for contactless measurement of a distance from the measurement aid to a point to be surveyed of the surface.

The measurement aid may also be a tactilely sampling measurement aid, in which case at least a part of the measurement aid is brought in contact with a point to be surveyed of the surface for the measurement. By bringing them in contact, coordinates of a point to be surveyed can be determined.

The inertial measurement unit (IMU) is designed to determine movement data during the movement of the measurement aid, which make the movement of the measurement aid describable in space. These movement data may, for example, relate to a position of the measurement aid and/or the spatial alignment of the measurement aid. Typically, for this purpose the IMU comprises a plurality of acceleration sensors and rotation rate sensors. On the basis of the movement data, for example, an orientation of the measurement aid may be determinable in up to three degrees of freedom.

The reflector may be a retroreflector. The reflector, in particular the retroreflector, is designed to reflect incident acquisition radiation in the direction of the beam source. The acquisition radiation reflected by the reflector makes the position of the measurement aid determinable for the measurement aid acquisition unit, for example a laser tracker.

For example, the reflector may be illuminated with laser radiation of a laser tracker, which is then reflected by the reflector in the direction of the laser tracker. On the basis of the detection of the reflected laser radiation, the laser tracker, or the surveying system, can determine the precise angle at which the reflector is illuminated. On the basis of laser radiation reflected by the reflector, a distance to the reflector may likewise be determinable for a laser tracker, or a distance measurement module. On the basis of the angle information relating to the direction of the emitted laser radiation and the distance determined to the reflector, the position of the reflector and therefore of the measurement aid is determinable for the laser tracker, or the measurement aid acquisition unit.

The in particular visual measurement aid markings are arranged in a defined spatial relation with respect to one another, and thereby form a specific pattern which is used to make the orientation of the measurement aid determinable for the measurement aid acquisition unit, for example a laser tracker.

The measurement aid markings may, for example, be light points. These light points may, for example, be generated by a light source at the respective points or by means of reflection of light intended therefor at the respective points.

The light of an individual light source may likewise be guided through light guides to the respective points.

Such light points then generate an orientation-specific pattern, which may be used by the measurement aid acquisition unit to determine the orientation of the measurement aid. The orientation-specific pattern may, for example, be a light point pattern.

In order to determine the orientation of the measurement aid, the light point pattern may be projected, or imaged, onto a plane for evaluation. The determination of the orientation of the measurement aid is then based on the pattern consisting of the light point projections changing orientation-specifically as a function of the orientation. For example, the light point projections of two light points approach one another or move away from one another during a rotation of the measurement aid about an axis which is arranged transversely with respect to the connecting axis that connects the two light points to one another and at the same time lies in a plane arranged parallel to the projection plane.

In this way, using the measurement aid acquisition unit, a position can be determined by means of the reflector and an orientation of the measurement aid can be determined by means of the measurement aid markings.

The distance measurement module is designed to measure a distance to the measurement aid by means of distance measurement radiation. The distance measurement module may be laser-based and designed to determine the distance on the basis of the principle of time-of-flight measurement or an interferometric principle. Typically, the distance measurement radiation is directed onto the reflector and at least partially reflected back therefrom to the distance measurement module. The distance measurement module is designed to determine the distance to the reflector, or the measurement aid, on the basis thereof.

The beam module is designed to emit acquisition radiation with a variable direction. The acquisition radiation may be laser radiation. The beam module may be designed to emit the acquisition radiation simultaneously in a plurality of directions which determine a determined angular range. The surveying system is configured in such a way that, when the acquisition radiation illuminates the reflector, it is reflected back by the reflector to the measurement aid acquisition unit. The measurement aid acquisition unit is then designed to detect the reflected acquisition radiation and to acquire and follow the measurement aid on the basis thereof. In this case, following means continuous alignment or readjustment of the acquisition field of view so that the reflector is or remains inside the acquisition field of view.

The acquisition and following of the measurement aid is therefore based on the detection of acquisition radiation reflected by the reflector.

Reflectors, in particular retroreflectors, often have a so-called effective angle of incidence range, radiation impinging within this angle of incidence range being reflected, in particular retroreflected. Radiation which impinges with an angle outside the angle of incidence range effective for reflection is not reflected as desired, or not reflected at all, in particular not retroreflected. For example, typical retroreflectors are designed for normal radiation incidence, although they are also retroreflectively effective for incidence at +/−45-60 degrees with respect to the normal. In other words, the reflector also has a so-called (effective) "field of view".

The acquisition and following of the measurement aid is therefore possible when the reflector lies in the acquisition field of view of the measurement aid acquisition unit and there is a so-called (effective) line of sight between the beam module, the measurement aid acquisition unit and the reflector, namely when the beam module, the measurement aid acquisition unit and the reflector are arranged and aligned relative to one another in such a way that detection of acquisition radiation, reflected by the reflector, of the beam module is possible.

The measurement aid acquisition unit is furthermore configured to acquire the measurement aid markings. For example, the measurement aid acquisition unit is designed to acquire and continuously evaluate the pattern formed by the measurement aid markings. On the basis of this evaluation, the orientation of the measurement aid can then be determined.

Furthermore, the measurement aid acquisition unit is configured to determine a position on the basis of a distance measured by means of the distance measurement module and angle information, determined by means of the surveying system, relating to the direction of the emitted distance measurement radiation, and to determine an orientation of the measurement aid on the basis of the acquisition of the measurement aid markings. On the basis of the position and orientation of the measurement aid and the distance, determined by the measurement aid, to a point to be surveyed of a surface, the coordinates of this point can be determined by the measurement aid acquisition unit.

According to the invention, the measurement aid acquisition unit is furthermore configured also to determine the coordinates of the points to be surveyed on the basis of measurement aid movement data determined by the IMU. In this case, the movement data may relate to a position and/or an orientation of the measurement aid. The surveying system according to the invention is therefore designed to use movement data which are determined by the IMU in order to determine the coordinates. In this way, the surveying system may be used flexibly and efficiently because there is a certain data redundancy.

The surveying system according to the invention is furthermore designed to use the movement data which are determined by the IMU in order to align the measurement aid acquisition unit, in particular continuously, so that the reflector is inside the acquisition field of view. In this way, the surveying system may be used efficiently because the reflector can always be kept in the acquisition field of view and is therefore acquirable as soon as there is a line of sight between the beam module, the measurement aid acquisition unit and the reflector. In this case, a line of sight is intended to mean that the beam module, the measurement aid acquisition unit and the reflector are arranged and aligned relative to one another in such a way that detection of acquisition radiation, reflected by the reflector, of the beam module is possible (see above).

According to one advantageous embodiment of the surveying system, it is configured in such a way that, in the event that the reflector is inside the acquisition field of view and there is a line of sight between the beam module, the measurement aid acquisition unit and the reflector, the measurement aid can be acquired and followed at least on the basis of acquisition radiation reflected by the reflector, and in the event that either the reflector is outside the acquisition field of view or there is no line of sight between the beam module, the measurement aid acquisition unit and the reflector, the measurement aid can be acquired and followed on the basis of measurement aid movement data determined by the IMU.

The latter may relate to cases in which, for example, a sightline between the reflector and the measurement aid acquisition unit is interrupted by an object and/or the reflector does not lie in the acquisition field of view.

This allows flexible and to a large extent uninterrupted use of the surveying system, since the acquisition and following of the measurement aid are possible even if there is no line of sight between the reflector, the beam module and the measurement aid acquisition unit, and coordinates of the points to be surveyed can be determined even then.

According to one advantageous embodiment of the surveying system, the reflector is formed by a plurality of reflectors and the plurality of reflectors are arranged on an outer region of the measurement aid and distributed thereover with a determined position relation with respect to one another.

In this case, the surveying system is configured, in the event that a first state in which one of the plurality of reflectors is inside the acquisition field of view and there is a line of sight between the beam module, the measurement aid acquisition unit and one of the plurality of reflectors, is followed by a state in which either the one of the plurality of reflectors is outside the acquisition field of view or there is no line of sight between the beam module, the measurement aid acquisition unit and the one of the plurality of reflectors, to align the measurement aid acquisition unit on the basis of measurement aid movement data determined by the IMU, in such a way that a length of time until one of the plurality of reflectors is inside the acquisition field of view and there is a line of sight between the beam module, the measurement aid acquisition unit and the one of the plurality of reflectors is minimized, or is as short as possible.

A state which follows the first state, referred to below as an interruption state, may in this case for example be a state in which none of the plurality of reflectors has a line of sight with the beam module and the measurement aid acquisition unit and/or in which none of the plurality of reflectors is in the acquisition field of view.

If such an interruption state follows the first state, the surveying system may be configured in such a way that the measurement aid acquisition unit is aligned continuously by means of the movement data so that one of the plurality of reflectors is again inside the acquisition field of view within a minimized length of time and/or there is again a line of sight with the beam module and the measurement aid acquisition unit.

For this purpose, the surveying system is for example configured to determine a prediction of a future position and orientation of the measurement aid on the basis of the movement data of the IMU, in particular a time profile of the movement data, the prediction being provided automatically to the measurement aid acquisition unit. The measurement aid acquisition unit is furthermore configured to align the acquisition field of view automatically with the prediction if the interruption state occurs.

For example, the measurement aid acquisition unit furthermore comprises an automatic target search functionality configured for automatic target searching in the vicinity of an initial alignment of the acquisition field of view, the prediction containing for example a time estimate of when the measurement aid will occupy the future position and orientation, and the target search functionality being triggered automatically on the basis of the time estimate.

According to one embodiment of the surveying system, the measurement aid markings are configured to emit and/or reflect light radiation.

For example, the measurement aid markings may be light points which are generated by means of light-emitting diode (LED) technology. The measurement aid markings may also be reflectors which are configured to reflect radiation, so that the reflected radiation can be detected as a pattern and evaluated by the measurement aid acquisition unit.

The use of LED technology allows variable adaptation of the light point pattern, for example by means of variable adjustment of light point intensities.

According to one embodiment of the surveying system, the measurement aid acquisition unit comprises a detector having a radiation-sensitive sensor. In this case, the measurement aid acquisition unit is configured to acquire and follow the measurement aid, and to acquire the measurement aid markings by means of the radiation-sensitive sensor.

The use of the same radiation-sensitive sensor for acquiring and following the measurement aid and acquiring the measurement aid markings allows embodiment of the surveying system in a simple and compact design, so that efficient surveying is provided.

According to one advantageous embodiment of the surveying system, the measurement aid acquisition unit is configured to determine a position and orientation of the measurement aid alternatively both by means of the measurement aid movement data determined by the IMU and by means of a combination of: by means of the reflector, by means of the measurement aid markings and by means of the measurement aid movement data determined by the IMU.

For example, the determination of a position and orientation of the measurement aid by means of a combination may mean that the position and orientation of the measurement aid can be determined by means of the reflector and by means of the measurement aid markings.

For example, the determination of a position and orientation of the measurement aid by means of a combination may mean that the position and orientation of the measurement aid can be determined by means of the reflector and by means of the measurement aid movement data determined by the IMU.

For example, the determination of a position and orientation of the measurement aid by means of a combination may mean that the position and orientation of the measurement aid can be determined by means of the measurement aid markings and by means of the measurement aid movement data determined by the IMU.

This combinability allows flexible determination of the position and orientation of the measurement aid by using redundant data. This also allows more efficient surveying which is less susceptible to interruption.

According to one embodiment of the surveying system, the measurement aid acquisition unit is configured to determine the orientation and position of the measurement aid on the basis of an acquisition criterion, by means of the measurement aid movement data determined by the IMU or by means of a combination of: by means of the reflector, by means of the measurement aid markings and by means of the measurement aid movement data determined by the IMU.

According to one embodiment of the surveying system, the acquisition criterion relates to at least one of the following states: the measurement aid is fully acquirable by means of the reflector and the measurement aid markings, the measurement aid is at least partially acquirable by means of the reflector and the measurement aid markings, the measurement aid is at least partially acquirable by means of the reflector or the measurement aid markings, and there is no line of sight between the reflector, the beam module and the measurement aid acquisition unit, and sightlines between the measurement aid markings and the measurement aid acquisition unit are interrupted (the measurement aid markings are not visible for the measurement aid acquisition unit).

This makes it possible for the position and orientation of the measurement aid to be determined situation-dependently by means of the suitable means. This in turn allows flexible use of the surveying system even in situations in which, for example, there is no line of sight with the reflector and/or the measurement aid markings are obscured. Or alternatively in situations in which the reflector and/or the measurement aid markings are outside the acquisition field of view.

According to one embodiment of the surveying system, the measurement aid acquisition unit is configured to determine the position and/or orientation of the measurement aid by means of the reflector and/or measurement aid markings at first instants, and by means of the movement data determined by the IMU at second instants, at least some of the second instants lying chronologically between the first instants.

The various approaches for determining the position and/or orientation of the measurement aid, one approach being based on the orientation and/or position determination by means of the reflector and/or measurement aid markings and another approach being based on the orientation and/or position determination by means of measurement aid movement data determined by the IMU, may be matched to one another so that a number of surveyable points per unit time can be optimized. This allows efficient surveying with a high time resolution.

According to one advantageous embodiment of the surveying system, the measurement aid acquisition unit is configured to determine the orientation of the measurement aid by means of the measurement aid markings and the movement data determined by the IMU, the measurement aid acquisition unit being configured to determine the orientation on the basis of measurement values averaged over a first time interval for determining the orientation by means of measurement aid markings, and measurement values averaged over a second time interval for determining the orientation by means of the movement data determined by the IMU.

Typically, measurement values are averaged in order to check a measurement value noise which is based on random measurement value deviations, and thereby the accuracy of the measurement. Because the orientation of the measurement aid can be determined by means of two approaches, the measurement values of each approach can be averaged, optionally independently of the averaging of the measurement values of the other respective approach, in order to check the measurement value noise for the respective approach. A combination of these approaches with respectively averaged measurement values allows high-precision determination of coordinates of points to be surveyed, even in cases in which the measurement aid is guided manually.

According to one embodiment of the surveying system, the measurement aid acquisition unit is furthermore configured to calibrate movement data determined by means of the IMU continuously on the basis of positions and/or orientations determined by means of the reflector and/or the measurement aid markings.

Typically, the measurement values of an IMU are affected by a systematic deviation. For example, the offsets of the IMU sensors and their scaling factors need to be calibrated continuously. In order to check a systematic deviation, the IMU may be calibrated and recalibrated at determined time intervals. Because the position and/or the orientation of the measurement aid can be determined by means of the IMU approach and also by means of the reflector and measurement aid marking approach, the measurement aid positions and orientations determined by means of the reflector and measurement aid marking approach may be used for calibration, in particular for continuous recalibration, of the IMU, for example for continuous calibration of IMU sensor offsets and associated scaling factors. This allows flexible use of the surveying system.

The IMU and calibration data in respect of position and/or orientation of the measurement aid, so-called absolute data, are for example combined by using a state estimation filter, for instance a Kalman filter. With this kind of filter, the 6DoF pose of the measurement aid as well as internal parameters such as IMU offsets are estimated with the aid of a statistical dynamic model. For each sensor measurement value, the model is updated accordingly, both the sensor measurement value, its uncertainty as well as an estimate of the dynamic range of the measurement aid being taken into account. This allows the fusion of different sensor types, possibly with different measurement rates, while the strengths of each sensor are benefited from. The IMU remains continuously calibrated and the high-frequency noise of the measurement system is attenuated and replaced with the IMU data, which are less affected by noise but more susceptible to drift.

If the IMU noise is low enough, the stochastic noise of the absolute system (for example due to air turbulence) may be eliminated virtually entirely so that a signal which is primarily limited by the systematic errors of the absolute system is provided. In many cases, this signal can be used during the movement without further averaging with an accuracy similar to a static measurement with averaging in a system without an IMU. In this way, for example, more rapid tactile measurements are made possible since the measurement aid does not have to be kept still for a relatively long time (for example 3 seconds) during the measurement. This long averaging time is primarily attributable to air turbulence, which fluctuates on a relatively "slow" time scale. A tracking accuracy which is at least as good as the tracking accuracy of a static measurement aid can therefore be achieved with scanning measurement aids.

By the combination of absolute measurements, for example carried out at 100 Hz, with IMU data, for example acquired at 1 kHz, it is possible to follow movements with a dynamic range that is an order of magnitude faster, without losing on absolute accuracy. The IMU therefore makes it possible to determine the absolute 6DoF system with a lower frame rate.

If a simple sensor fusion filter is used, which for example estimates only the orientation of the measurement aid by the IMU and estimates the measurement aid markings, while the absolute positions of the reflector are used without modification, the same type of state estimation filter algorithm as described above could be used. As an alternative, a simplified algorithm may be used, for example a lowpass filter for the absolute angles and an adapted highpass filter for the IMU angles, so that the resulting signal has a flat frequency response and the absolute accuracy of the marker-based system is preserved, while it profits from the reduced noise and the higher sampling rate of the IMU data.

For real-time applications such as the obstacle avoidance described below, in which a fast reaction time is important, the state estimation filter runs for example only forward, i.e. in a causal mode (=only using information from earlier measurements, not future information).

For applications with high accuracy, such as interpolation or noise suppression, the filter runs for example in a way which is adapted so that it is not causal, future information also being used in order to estimate the state at each point. This may for example be carried out by so-called Kalman filter "smoothing", the filter additionally being run backward once over the data set in order to propagate state information in the opposite direction.

It may furthermore be advantageous to take the approximate geographical location into account for the absolute data in order to compensate for the Earth's rotation.

According to one embodiment of the surveying system, the surveying system is configured to identify an approach of the measurement aid to an obstacle with a particular position and shape on the basis of the movement data determined by means of the IMU.

For example, the surveying system may have data relating to positions and shapes of obstacles which are located at the surface to be surveyed. These data may be referenced with the position of the measurement aid, so that the movement of the measurement aid can be followed relative to the obstacles by means of the movement data which are determined by the IMU. On the basis of this following, an approach of the measurement aid to an obstacle can be identified. On the basis of the identification of an approach, a user of the surveying system may be warned of a possible collision. This allows reliable and efficient use of the surveying system.

According to one embodiment of the surveying system, the surveying system is configured to automatically trigger the identification of an approach if, in particular during a determined period of time, there is no line of sight between the reflector and the measurement aid acquisition unit.

In this way, for example, a collision of the measurement aid may also be prevented in situations in which the measurement aid is not being used directly for the surveying.

According to one embodiment of the surveying system, the surveying system is configured to signal identification of an approach by means of an optical and/or acoustic and/or haptic feedback to a user of the measurement aid.

According to one embodiment of the surveying system, the measurement aid is a laser scanner, and the beam module, the distance measurement module and the measurement aid acquisition unit are parts of a laser tracker.

BRIEF DESCRIPTION OF THE FIGURES

The surveying system according to the invention will be described in more detail purely by way of example below with the aid of specific exemplary embodiments schematically represented in the drawings, further advantages of the invention also being discussed. In detail.

DETAILED DESCRIPTION OF THE INVENTION

Figure 1:
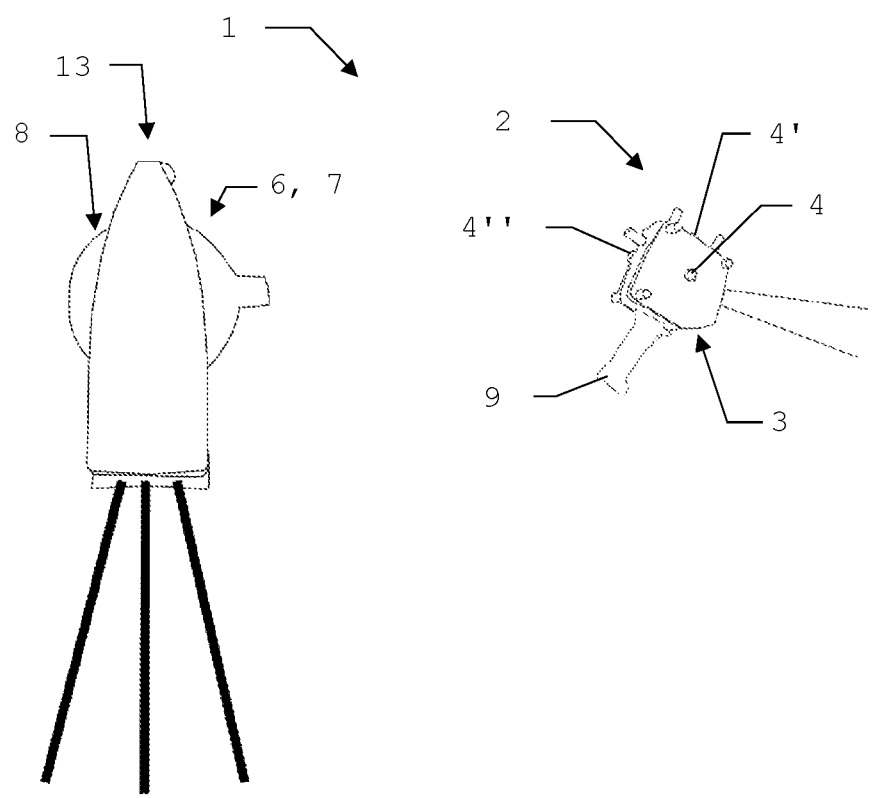
FIG. 1 shows an embodiment of the surveying system for determining coordinates of points of a surface which are to be surveyed.

FIG. 1 shows a surveying system 1 according to one embodiment of the invention. The surveying system comprises a measurement aid 2. The measurement aid is designed to be guided manually and to contactlessly sample points of a surface which are to be surveyed. The surveying system has a distance measurement module 6, which is designed to measure a distance to the measurement aid 2. The surveying system 1 furthermore comprises a beam module 7, which is designed to emit acquisition radiation with a variable direction. The surveying system shown in FIG. 1 furthermore has an alignable measurement aid acquisition unit 8.

The surveying system 1 shown in FIG. 1 shows a laser tracker 13 and a measurement aid, which is embodied as a laser scanner.

Figure 2:
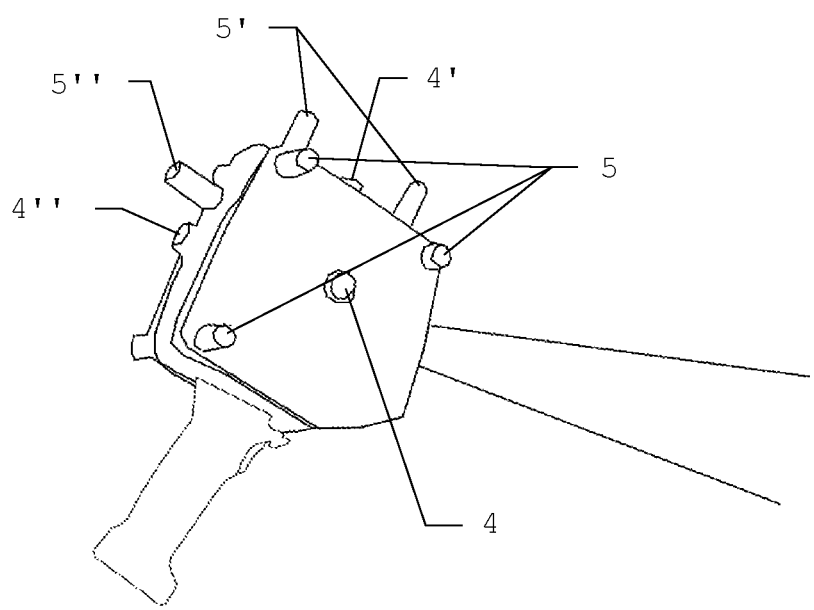
FIG. 2 shows an embodiment of a manually guidable measurement aid for the contactless sampling of points of a surface which are to be surveyed.

The measurement aid 2 shown in FIG. 1 and FIG. 2 has an inertial measurement unit (IMU) 3 (not shown) which is integrated in the measurement aid and determines movement data of the measurement aid. The measurement aid furthermore has a plurality of reflectors 4, 4', 4'', which form a reflector, and a plurality of measurement aid markings 5, 5', 5''. The measurement aid comprises a handle 9, by means of which the measurement aid can be manually guided.

Figure 3:
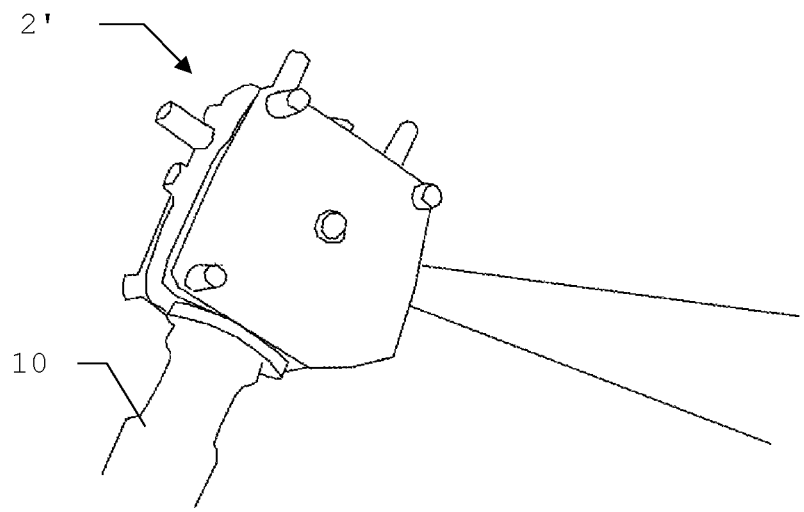
FIG. 3 shows an embodiment of an automatically guided measurement aid for the contactless sampling of points of a surface which are to be surveyed.

The measurement aid 2' shown in FIG. 3 is designed to be automatically guided. For this purpose, it is fitted on an element 10 of an automatically guided unit, for example a robot.

Figure 4:
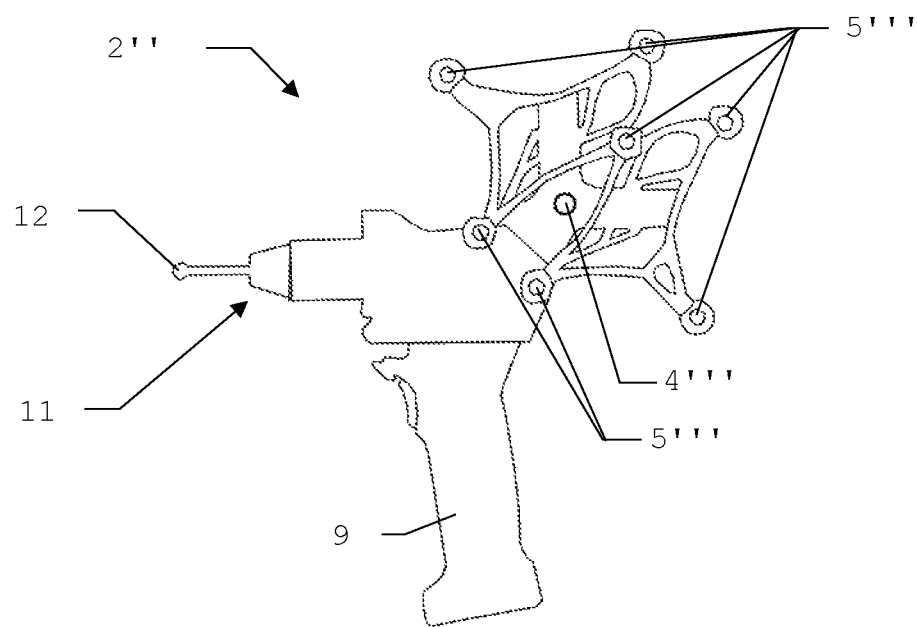
FIG. 4 shows an embodiment of a manually guidable measurement aid for the tactile sampling of points of a surface which are to be surveyed.

FIG. 4 shows a measurement aid 2'' which is designed to be manually guided and to tactilely sample points of a surface which are to be surveyed. For this purpose, the measurement aid has a tactile sensor attachment 11 with a ball 12 which is brought to touch a point to be surveyed. The measurement aid 2'' comprises a reflector 4''' and a plurality of measurement aid markings 5'''.

It is to be understood that these figures as represented only schematically represent possible exemplary embodiments.

The invention claimed is:

1. A surveying system for the laser tracker-based determination of coordinates of points of a surface which are to be surveyed, having
a measurement aid for sampling the points of the surface which are to be surveyed, by a laser scanner, comprising
an inertial measurement unit (IMU) for determining movement data of the measurement aid,
a reflector, and
a plurality of measurement aid markings,
the plurality of measurement aid markings being arranged in a determined position relation with respect to one another and so as to form a pattern on the measurement aid, so that by using the surveying system, a position can be determined by means of the reflector and an orientation of the measurement aid can be determined by means of the measurement aid markings,
a distance measurement module,
a beam module for variable-direction emission of acquisition radiation,
an alignable measurement aid acquisition unit, which is communicatively connectable to the measurement aid and has an acquisition field of view, the measurement aid acquisition unit being configured to
acquire and follow the measurement aid on the basis of acquisition radiation reflected by the reflector,
acquire the measurement aid markings, and
determine coordinates of the points of the surface which are to be surveyed, on the basis of
the acquisition and following of the measurement aid,
the acquisition of the measurement aid markings,
a distance to the measurement aid, determined by means of the distance measurement module, and
the sampling by the measurement aid of the points of the surface which are to be surveyed,
wherein
the measurement aid acquisition unit is furthermore configured to determine coordinates of the points of the surface which are to be surveyed, on the basis of measurement aid movement data determined by the IMU, and
the surveying system is configured to align the measurement aid acquisition unit on the basis of measurement aid movement data determined by the IMU, in such a way that the reflector is inside the acquisition field of view.

2. The surveying system according to claim 1, wherein the surveying system is configured in such a way that
in the event that the reflector is inside the acquisition field of view and there is a line of sight between the beam module, the measurement aid acquisition unit and the reflector, the measurement aid can be acquired and followed at least on the basis of acquisition radiation reflected by the reflector, and
in the event that either the reflector is outside the acquisition field of view or there is no line of sight between the beam module, the measurement aid acquisition unit and the reflector, the measurement aid can be acquired and followed on the basis of measurement aid movement data determined by the IMU.

3. The surveying system according to claim 2, wherein the reflector is formed by a plurality of reflectors and the plurality of reflectors are arranged on an outer region of the measurement aid and distributed thereover with a determined position relation with respect to one another,
wherein the surveying system is configured, in the event that a first state in which one of the plurality of reflectors is inside the acquisition field of view and there is a line of sight between the beam module, the measurement aid acquisition unit and one of the plurality of reflectors, is followed by a state in which either the one of the plurality of reflectors is outside the acquisition field of view or there is no line of sight between the beam module, the measurement aid acquisition unit and the one of the plurality of reflectors, to align the measurement aid acquisition unit on the basis of measurement aid movement data determined by the IMU, in such a way that a length of time until one of the plurality of reflectors is inside the acquisition field of view and there is a line of sight between the beam module, the measurement aid acquisition unit and the one of the plurality of reflectors is minimized.

4. The surveying system according to claim 1, wherein the measurement aid markings are configured to emit and/or to reflect light radiation.

5. The surveying system according to claim 1, wherein the measurement aid acquisition unit comprises a detector having a radiation-sensitive sensor, wherein the measurement aid acquisition unit is configured to
acquire and follow the measurement aid, and
acquire the measurement aid markings by means of the radiation-sensitive sensor.

6. The surveying system according to claim 1, wherein the measurement aid acquisition unit is configured to determine a position and orientation of the measurement aid alternatively both
by means of the measurement aid movement data determined by the IMU, and
by means of a combination of
by means of the reflector,
by means of the measurement aid markings and
by means of the measurement aid movement data determined by the IMU.

7. The surveying system according to claim 1, wherein the measurement aid acquisition unit is configured to determine the orientation and position of the measurement aid on the basis of an acquisition criterion,
by means of the measurement aid movement data determined by the IMU or
by means of a combination of
by means of the reflector,
by means of the measurement aid markings and
by means of the measurement aid movement data determined by the IMU.

8. The surveying system according to claim 7, wherein the acquisition criterion relates to at least one of the following states
the measurement aid is fully acquirable by means of the reflector and the measurement aid markings,
the measurement aid is at least partially acquirable by means of the reflector and the measurement aid markings,
the measurement aid is at least partially acquirable by means of the reflector or the measurement aid markings, and
there is no line of sight between the reflector and the measurement aid acquisition unit and sightlines between the measurement aid markings and the measurement aid acquisition unit are interrupted.

9. The surveying system according to claim 1, wherein the measurement aid acquisition unit is configured to determine the position and/or orientation of the measurement aid by means of the reflector and/or measurement aid markings at first instants, and by means of the movement data determined by the IMU at second instants, at least some of the second instants lying chronologically between the first instants.

10. The surveying system according to claim 1, wherein the measurement aid acquisition unit is configured to determine the orientation of the measurement aid by means of the measurement aid markings and the movement data determined by the IMU, wherein the measurement aid acquisition unit is configured to determine the orientation on the basis of measurement values averaged over a first time interval for determining the orientation by means of measurement aid markings, and measurement values averaged over a second time interval for determining the orientation by means of the movement data determined by the IMU.

11. The surveying system according to claim 1, wherein the measurement aid acquisition unit is furthermore configured to calibrate movement data determined by means of the IMU continuously on the basis of positions and orientations determined by means of the reflector and the measurement aid markings.

12. The surveying system according to claim 1, wherein the surveying system is configured to identify an approach of the measurement aid to an obstacle with a particular position and shape on the basis of the movement data determined by means of the IMU.

13. The surveying system according to claim 12, wherein the surveying system is configured to automatically trigger the identification of an approach if, in particular during a determined period of time, there is no line of sight between the reflector, the beam module and the measurement aid acquisition unit.

14. The surveying system according to claim 13, wherein the surveying system is configured to signal identification of an approach by means of an optical and/or acoustic and/or haptic feedback to a user of the measurement aid.

15. The surveying system according to claim 1, wherein the measurement aid is a laser scanner, and the beam module, the distance measurement module and the measurement aid acquisition unit are parts of a laser tracker.

* * * * *